United States Patent
Grebe et al.

(10) Patent No.: US 6,843,341 B2
(45) Date of Patent: Jan. 18, 2005

(54) METHOD OF CONTROLLING A POWER STEERING SYSTEM

(75) Inventors: Kai Grebe, Siegburg (DE); Ulrich Wienecke, Aachen (DE); Jochen Gessat, Brühl (DE)

(73) Assignee: TRW Fahrwerksysteme GmbH & Co. KG (DE)

(*) Notice: Subject to any disclaimer, the term of this patent is extended or adjusted under 35 U.S.C. 154(b) by 185 days.

(21) Appl. No.: 10/121,429

(22) Filed: Apr. 12, 2002

(65) Prior Publication Data

US 2002/0166319 A1 Nov. 14, 2002

(30) Foreign Application Priority Data

Apr. 17, 2001 (DE) .......................................... 101 18 739

(51) Int. Cl.[7] .............................................. B62D 5/06
(52) U.S. Cl. ...................................... 180/422; 180/421
(58) Field of Search .............................. 180/402, 403, 180/417, 421, 422, 439, 441, 442, 443, 446; 701/41

(56) References Cited

U.S. PATENT DOCUMENTS

| | | | |
|---|---|---|---|
| 4,354,422 A | * 10/1982 | Nishikawa et al. | ....... 91/358 R |
| 4,683,972 A | 8/1987 | Foerster | |
| 4,785,901 A | 11/1988 | Maeda | |
| 5,267,627 A | * 12/1993 | Frank et al. | ............ 180/422 |
| 5,279,380 A | * 1/1994 | Frank et al. | ............ 180/422 |
| 5,314,036 A | 5/1994 | Kato et al. | |
| 6,073,721 A | * 6/2000 | Grabowski | ............ 180/422 |
| 6,298,941 B1 | * 10/2001 | Spadafora | ............ 180/422 |
| 6,345,682 B1 | 2/2002 | Schoffler et al. | |
| 6,488,112 B1 | 12/2002 | Kleist | |
| 2001/0026613 A1 | 10/2001 | Hackl et al. | |
| 2002/0148670 A1 | * 10/2002 | Schymczyk et al. | ......... 180/417 |
| 2002/0170769 A1 | * 11/2002 | Sakaki et al. | ............... 180/441 |

FOREIGN PATENT DOCUMENTS

| | | | |
|---|---|---|---|
| DE | 35 39 607 | 5/1987 | |
| DE | 37 23 770 | 1/1988 | |
| DE | 197 54 278 | 6/1998 | |
| DE | 197 13 576 | 10/1998 | |
| DE | 198 32 728 | 3/1999 | |
| DE | 299 20 122 | 4/2000 | |
| DE | 198 52 061 | 5/2000 | |
| EP | 0 962 377 | 12/1999 | |
| JP | 2003231477 A | * 8/2003 | ............ B62D/5/07 |
| WO | 97/08036 | 3/1997 | |

* cited by examiner

Primary Examiner—Lesley D. Morris
Assistant Examiner—Daniel Yeagley
(74) Attorney, Agent, or Firm—MacMillan, Sobanski & Todd, LLC

(57) ABSTRACT

A method of controlling a power steering system having an adjusting mechanism for adjusting at least one vehicle wheel is disclosed herein. The system includes a steering wheel, a position sensor, and a drive system, such as a servo pump driven by an electric motor, to provide steering assistance a steering wheel and a position sensor. It is determined whether the adjusting mechanism is approaching an end position. If it is found that the adjusting mechanism is approaching the end position, then the drive system is controlled in such a way that it provides a diminishing steering assistance.

6 Claims, 1 Drawing Sheet

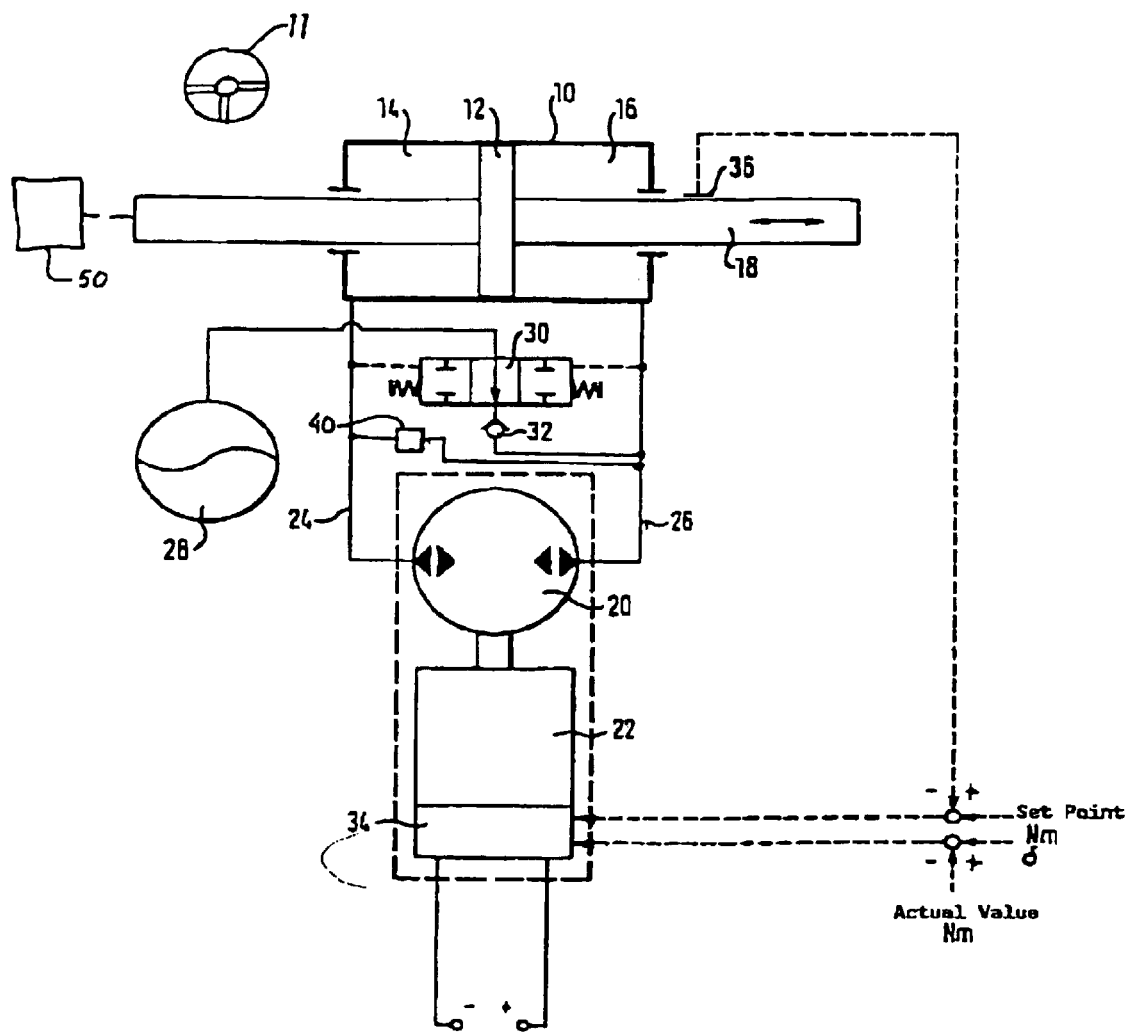

METHOD OF CONTROLLING A POWER STEERING SYSTEM

CROSS REFERENCE TO RELATED APPLICATIONS

This application claims foreign priority benefits of German Patent Application No. 10118739.4 filed Apr. 17, 2001.

BACKGROUND OF THE INVENTION

Such a power steering system normally has an adjusting mechanism that can swivel at least one vehicle wheel via a steering linkage, a steering wheel that is coupled to the adjusting mechanism and predefines a set point for the steering direction, as well as a drive means to provide steering assistance so as to reduce the torque that has to be applied to the steering wheel in order to adjust the vehicle wheel. With a hydraulic power steering system, the drive means normally provided is a servo pump that is driven by an electric motor and that provides a hydraulic oil flow. With an electric power steering system, the drive means provided is an electric motor that is coupled to the adjusting mechanism.

In order to prevent the adjusting mechanism from striking against an end stop at high speed after a full steering wheel turn angle, a hydraulic power steering system normally has stop valves that are opened when the piston of a hydraulic cylinder, in which the hydraulic oil flow is converted into a steering assistance force, approaches an end position. In this manner, the pressure in the hydraulic cylinder is reduced in time so that the reaching of the end position does not result in excessive mechanical stress and corresponding wear and tear.

The object of the invention is to provide a method of controlling a power steering system in which there can be prevented with low expenditure that the adjusting mechanism reaches an end position with a high steering assistance force.

SUMMARY OF THE INVENTION

According to the invention, a method of controlling a power steering system is provided, such system including an adjusting mechanism for adjusting at least one vehicle wheel, a drive means to provide steering assistance, a steering wheel and a position sensor. The method comprises the following steps: it is determined whether the adjusting mechanism is approaching an end position. If it is found that the adjusting mechanism is approaching the end position, then the drive means is controlled in such a way that it provides diminishing steering assistance. Thus, no mechanical valves or the like are needed in order to prevent the adjusting mechanism from reaching an end position at a high steering assistance force; already by evaluating signals that are for the most part available, the steering assistance can be regulated in such a way that, by reducing the supplied steering assistance force at an appropriately early point in time, the adjustment speed of the adjusting mechanism is diminished shortly before the end position is reached.

According to an embodiment of the invention, it is provided that the position sensor detects the absolute position of the adjusting mechanism. Suitable sensors for the adjusting mechanism that detect the absolute angular position are known and are already used for other functions, for example, for electronic stability control systems. Consequently, no additional design work is required. As an alternative, it can also be provided that the position sensor detects the distance from an end position. For this purpose, simpler mechanical sensors are sufficient.

It can be provided that the adjustment speed determined by the position sensor is polled in order to determine the speed at which the adjusting mechanism is approaching the end position. In this manner, it is possible to determine how quickly the drive means has to be regulated down, on the one hands in order to reduce the supplied steering assistance force in time before the mechanism reaches the end position and, on the other hand, in order not to restrict the available adjustment range of the adjusting mechanism as a result of premature regulating down.

If the drive means is a servo pump that is driven by an electric motor, the speed of the electric motor is preferably regulated down when it is detected that the adjusting mechanism is approaching an end position. If the drive means is an electric motor, indicated schematically at 50, that is directly coupled to the adjusting mechanism, the steering assistance torque of the electric motor is preferably regulated down when it is detected that the adjusting mechanism is approaching an end position.

Advantageous embodiments of the invention will be apparent from the subordinate claims.

BRIEF DESCRIPTION OF THE DRAWING

The single FIGURE schematically shows a steering system according to the invention.

DETAILED DESCRIPTION OF THE INVENTION

The invention will be described below with reference to a preferred embodiment which is shown in the FIGURE. The system according to the invention is configured here as an electro-hydraulic steering system without a mechanical connection between the steering wheel, schematically illustrated in the FIGURE at 11, and the vehicle wheels. However, the invention can likewise be used in steering systems that have a mechanical steering mechanism and additionally an electric or electro-hydraulic power-assisted steering system.

The electro-hydraulic steering system comprises, as its adjusting mechanism, a servo cylinder 10 with a piston 12 that divides the interior of the cylinder into two chambers 14, 16. By exerting pressure on one or the other of the two chambers, the piston 12 and thus a piston rod 18 connected thereto can be adjusted. The piston rod 18 is connected to steerable vehicle wheels (not shown in the FIGURE) so that, by adjusting the piston 12 in the servo cylinder 10, a steering assistance force can be transmitted to the vehicle wheels.

As the drive means, there is provided a servo pump 20 that is driven by an electric motor 22. The servo pump 20 can be run in two conveying directions. One side of the pump 20 is connected via a pressure line 24 to the first chamber 14 of the servo cylinder 10, and the other side of the pump 22 is connected via a pressure line 26 to the second chamber 16. In this manner, a closed system is formed that is filled with a hydraulic fluid.

A hydraulic reservoir 28 is provided that is filled with hydraulic fluid being subject to a pressure that corresponds to about half of the maximum hydraulic pressure in the hydraulic system, the latter consisting of the two chambers 14, 16, of the two pressure lines 24, 26 and of the servo pump 20. The reservoir 28 is connected to the hydraulic system via a charging valve 30 and a check valve 32 so that the hydraulic system is kept under the pressure that prevails in the reservoir 28.

The electric motor 22 is controlled by an electronic control unit 34. Set points for the steering angle and the steering torque as well as the actual value of the steering torque and of the steering angle are transmitted to the control unit 34. For this purpose, a steering wheel sensor is provided (not shown in the FIGURE). Furthermore, the control unit 34 receives a parameter that corresponds to the steering angle or to the travel of the servo cylinder. For this purpose, there is provided a position sensor 36 that detects the absolute position of the adjusting mechanism here. If a steering system with a rigid mechanical coupling between the steering wheel and the steering mechanism is used, the absolute angle position of the steering wheel can also be detected by a steering angle sensor, as an alternative.

The steering system functions as follows: when the control unit 34 recognizes that steering assistance has to be supplied, for example, on the basis of the set point for the steering angle that can be detected on a vehicle steering wheel, or on the basis of the difference between the set point and the actual value for the steering torque, the servo pump 20 is run in the appropriate direction in order to suitably pressurize one or the other of the two chambers 14, 16. This pressure is immediately available since the hydraulic system is pre-pressurized by the reservoir 28; consequently, the servo pump 20 does not first have to build up a system pressure immediately after starting up. As soon as the control unit 34 recognizes that no further steering assistance is needed, the electric motor 22 is switched off again so that the servo pump 20 stops. In this manner, drive energy for the steering system is only needed when steering force assistance is also needed. Moreover, no complicated mechanical components are required in order to feed the volume flow supplied by the servo pump to the chambers 14, 16, since this volume flow is immediately supplied by the pump in the right amount and in the right direction.

The control unit checks with the aid of the position sensor 36 at regular intervals to ascertain whether the servo cylinder 10 is approaching an end position, that is to say, whether the piston 12 is approaching the end face of one of the chambers 14, 16. If such a state is detected, then the electric motor 22 is regulated down by the control unit in such a way that the servo pump provides diminishing steering assistance. Preferably, the steering assistance drops to zero just before the end position is reached.

In an alternate embodiment of the invention, the drive means includes a servo pump that is driven by an electric motor, wherein an electronic pressure limiting valve, indicated schematically at 40, is opened when it is detected that the adjusting mechanism is approaching the end position.

Preferably, the speed at which the piston is approaching the end position is determined by evaluating the adjustment speed of the piston in the servo cylinder. If the piston is approaching the end position at a high speed, the steering assistance has to be diminished fairly abruptly. If the piston is approaching the end position at a low speed, the steering assistance can be diminished gradually, resulting in a comfortable end position damping.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of controlling a power steering system having an adjusting mechanism for adjusting at least one vehicle wheel, a drive means to provide steering assistance, a steering wheel and a position sensor, said method comprising the following steps:

determining whether said adjusting mechanism is approaching an end position;

controlling said drive means in such a way that said drive means provides a diminishing steering assistance if said adjustment mechanism is found to be approaching said end position;

wherein said position sensor determines an adjustment speed which is polled in order to determine a speed at which said adjusting mechanism is approaching said end position.

2. The method according to claim 1, wherein said position sensor detects an absolute position of said adjusting mechanism.

3. The method according to claim 1, wherein said position sensor detects that said adjusting mechanism is approaching said end position.

4. The method according to claim 1, wherein said drive means is a servo pump that is driven by an electric motor and wherein a rotational speed of said electric motor is regulated down when said adjusting mechanism is detected approaching said end position.

5. The method according to claim 1, wherein said drive means is a servo pump that is driven by an electric motor and wherein an electronic pressure limiting valve is opened when said adjusting mechanism is detected approaching said end position.

6. The method according to claim 1, wherein said drive means is an electric motor that is directly coupled to said adjusting mechanism and wherein a steering assistance torque of said electric motor is regulated down when said adjusting mechanism is detected approaching said end position.

* * * * *